A. KOCH.
Refrigerator.
No. 77,624.　　　　　　　　　　　　　　　　Patented May 5, 1868.
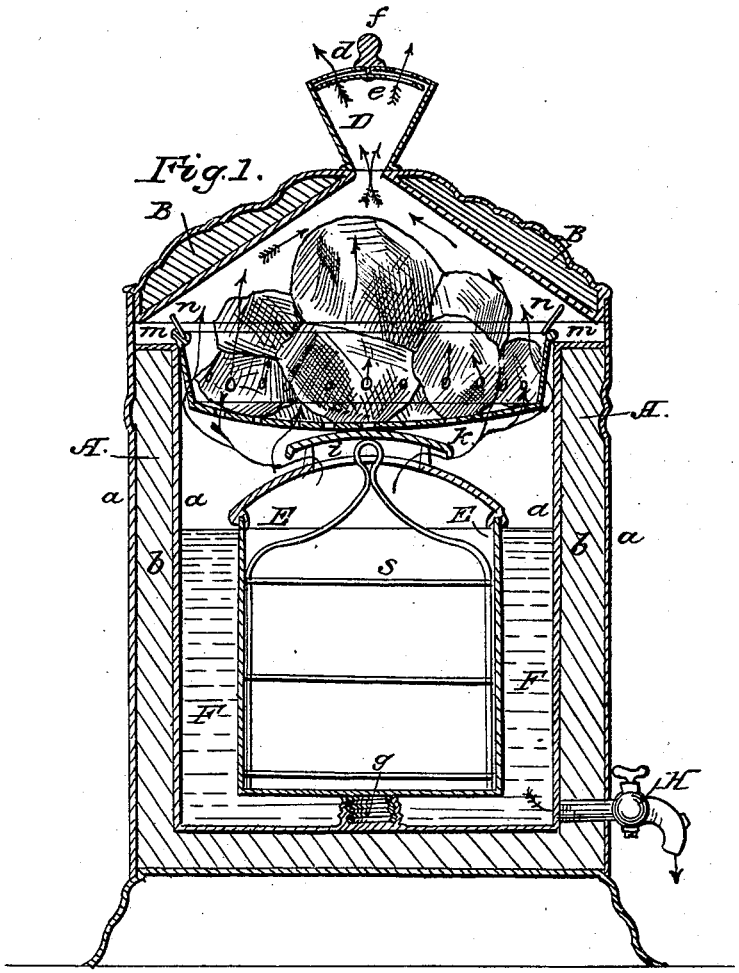
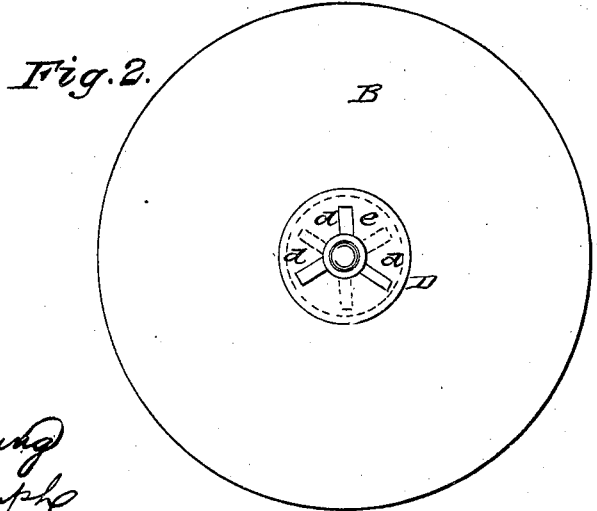
WITNESSES:
H. H. Young
J. M. Stumph
INVENTOR.
August Koch
Per
David A. Burr
atty.

United States Patent Office.

AUGUST KOCH, OF BALTIMORE, MARYLAND

Letters Patent No. 77,624, dated May 5, 1868.

IMPROVED COOLER AND REFRIGERATOR.

The Schedule referred to in these Letters Patent and making part of the same.

TO ALL WHOM IT MAY CONCERN:

Be it known that I, AUGUST KOCH, of the city and county of Baltimore, in the State of Maryland, have invented a new and improved Water-Cooler and Refrigerator; and I do hereby declare the following to be a full and exact description thereof, reference being had to the accompanying drawings, forming a part of this specification, in which—

Figure 1 is a central vertical section through my improved cooler, and

Figure 2 a plan of the top thereof.

Similar letters indicate like parts in each of the figures.

The nature of my invention consists in the combination of a perforated detachable ice-pan, placed in the upper part of a water-cooler, with a ventilated cover for the cooler, a refrigerating-box placed within the same beneath the ice-pan, and a water-space surrounding said box, so that the cold water dripping from the ice shall fall into and cool the water in the water-space, and the air cooled by the ice descend upon the water and into the refrigerating-box, whilst the impure and warmer air from the box, and from the water surrounding it, may freely escape, keeping the whole apparatus and its contents sweet and pure at a very low temperature.

The outer walls A of my water-cooler may be made in the usual manner, of an inner and outer shell, $a$ and $a'$, separated by a lining, $h$, of charcoal or other good non-conducting material.

The cover B is similarly made and lined; but I make the knob D, forming a handle to lift the same, hollow, and provide it with apertures $d\,d\,d$, (see fig. 2,) opening outwardly, and closed at pleasure by a slotted plate, $e$, fig. 1, pivoted on the inner side of the top of the knob. This plate is secured to a button, $f$, whereby it may be turned so as to cover or uncover, and thus open or close the apertures $d$.

Centrally, within the cooler, is placed a metallic vessel or box, E, which is made so much smaller in section or diameter than the inner diameter of the cooler as that a water-space, F, shall be left between the two. This inner vessel rests upon a support, G, projecting centrally from the bottom of the cooler, so that the water-space F extends beneath, as well as around, the vessel E. A threaded collar, $g$, is secured outwardly upon the bottom of the vessel E, to screw either upon or into the support G, and thus fasten said vessel in place; or the support may be made hollow, to receive a pin projecting from the vessel for the same purpose.

An outer spigot, H, extends to and communicates with the space F, to permit water to be drawn therefrom at pleasure. The lid or cover of the vessel or box E is pierced centrally with a ventilating-aperture, $i$, over which is placed a cap, $k$, completely covering the same, but so elevated therefrom as to allow a free circulation of air beneath it, through the aperture $i$. Within the box E, I contemplate placing a detachable rack, S, having one or more perforated shelves or wire frames, upon which to place butter and other articles to be preserved and cooled therein. The vessel E is so proportioned in height as to leave a space between its cover and the top of the cooler to receive a perforated ice-pan, L, whose rim $m$ is made to rest upon the upper inner edge of the cooler, and be supported thereby within the cooler, the depth of the pan being such as that its bottom will barely touch the top of the cover of the vessel E beneath. Rings $n\,n$ are secured to the rim $m$, for lifting and removing the pan L.

In using my improved cooler, the vessel E, being first secured in place within the same, I fill the surrounding space, F, with water, up nearly to the top of said vessel, within which I place, by means of the rack S, butter, meats, or other articles to be kept cool. Having then covered this vessel with its ventilating-cover, I place the ice-pan L, filled with ice, in the top of the cooler, and then cover the cooler with its cover B. The ice-water and cold air descending from the ice will rapidly cool the water and the vessel E and its contents, whilst the warmer air therefrom will rise through the ventilating-apertures as fast as it is displaced by the cold air from the ice. The cap $k$ prevents the entrance of the dripping ice-water into the vessel E, and yet allows a free ventilation thereof. The ice-pan, when filled, may be readily removed, without disturbing the ice, by means of its rings $n\,n$, and the contents of the inner vessel or box, E, be thus reached without difficulty.

Having thus fully described my invention, what I claim therein as new, and desire to secure by Letters Patent, is—

The combination of a detachable sieve or perforated ice-pan, L, with the upper part of a ventilated water-cooler, A, and with a ventilated refrigerating-box or vessel, E, placed centrally therein beneath said pan, and surrounded by a water-space, F, all substantially as and for the purpose herein set forth.

The foregoing specification of my improved water-cooler and refrigerator signed by me, this ninth day of April, A. D. 1868.

AUGUST KOCH.

Witnesses:
  DAVID A. BURR,
  H. H. YOUNG.